United States Patent [19]

Emmett, Jr. et al.

[11] Patent Number: 4,968,008
[45] Date of Patent: * Nov. 6, 1990

[54] BIOLEACHING APPARATUS AND SYSTEM

[75] Inventors: Robert C. Emmett, Jr., Salt Lake City; Lawrence T. O'Connor, Midvale; Gunter H. Brox, Salt Lake City, all of Utah

[73] Assignee: Envirotech Corporation, Menlo Park, Calif.

[*] Notice: The portion of the term of this patent subsequent to Mar. 1, 2005 has been disclaimed.

[21] Appl. No.: 248,620

[22] Filed: Sep. 26, 1988

Related U.S. Application Data

[63] Continuation of Ser. No. 5,670, Jan. 21, 1987, which is a continuation-in-part of Ser. No. 827,324, Feb. 7, 1986, Pat. No. 4,728,082.

[51] Int. Cl.$^5$ .................................................. C22B 3/02
[52] U.S. Cl. ................................... 266/168; 266/170; 266/101; 75/101 R; 75/118 R; 423/DIG. 17
[58] Field of Search ..................... 266/168, 170, 101; 75/101 R, 118 R; 423/DIG. 17

[56] References Cited

U.S. PATENT DOCUMENTS

| | | | |
|---|---|---|---|
| 1,642,051 | 9/1927 | Wall | 261/122 |
| 2,718,275 | 9/1955 | Banks | 261/122 |
| 2,829,964 | 4/1958 | Zimmerley | 423/DIG. 17 |
| 3,336,016 | 8/1967 | Schreiber | 210/14 |
| 3,396,950 | 8/1968 | Wood | 261/122 |
| 3,433,629 | 3/1969 | Imai et al. | 423/DIG. 17 |
| 3,441,216 | 4/1969 | Good | 261/122 |
| 3,490,752 | 1/1970 | Danjes et al. | 210/220 |
| 3,495,712 | 2/1970 | Schreiber | 210/14 |
| 3,533,508 | 10/1970 | Siepp et al. | 210/195 |
| 3,537,583 | 11/1970 | Wahmer et al. | 210/195 |
| 3,642,260 | 2/1972 | Danjes et al. | 261/122 |
| 3,836,131 | 9/1974 | Beggs | 266/20 |
| 3,951,758 | 4/1976 | Porsch | 210/14 |
| 3,977,606 | 8/1976 | Wyss | 239/145 |
| 3,997,634 | 12/1976 | Downs | 261/122 |
| 4,007,240 | 2/1977 | Gosden | 261/122 |
| 4,046,845 | 9/1977 | Veeder | 261/122 |
| 4,243,616 | 1/1981 | Wyss | 261/122 |
| 4,440,644 | 4/1984 | Mudder | 210/611 |
| 4,461,834 | 7/1984 | Mudder | 435/253 |
| 4,468,327 | 8/1984 | Brown | 423/DIG. 17 |
| 4,497,778 | 12/1984 | Pooley | 423/DIG. 17 |
| 4,571,387 | 2/1986 | Bruynesteyn et al. | 75/101 R |
| 4,728,082 | 3/1988 | Emmett, Jr. et al. | 423/150 |
| 4,732,608 | 3/1988 | Emmett, Jr. et al. | 75/101 R |

FOREIGN PATENT DOCUMENTS

| | | |
|---|---|---|
| 45769 | 8/1985 | Australia . |
| 0004431 | 3/1979 | European Pat. Off. . |
| 8426854 | 11/1985 | Fed. Rep. of Germany . |
| 853701 | 5/1985 | South Africa . |
| 899119 | 5/1980 | U.S.S.R. . |
| 1359324 | 1/1982 | U.S.S.R. . |
| 824376 | 11/1959 | United Kingdom . |
| 2180829 | 9/1986 | United Kingdom . |

OTHER PUBLICATIONS

Brochure: Schreiber Counter Current Plants (Trussville, AL).
Brochure: Schreiber Counter Current Aeration Tank Model GR (Trussville, AL).
Brochure: Schreiber Counter Current Aeration (Trussville, AL).
Brochure: Schreiber Counter Current Aeration Tank Model GRZ (Trussville, AL).
Brochure: Schreiber Counter Current Aeration Tank Model GRO (Trussville, AL).
Brochure: Scheiber Counter Current Aeration Tank Model GRD (Trussville, AL).

(List continued on next page.)

Primary Examiner—Robert L. Stoll
Assistant Examiner—Steven J. Bos
Attorney, Agent, or Firm—Trask, Britt & Rossa

[57] ABSTRACT

A reactor for use in processing metal bearing solids by means of a bioleaching technique is disclosed. The reactor includes an open topped basin, a gantry adapted for displacement along the length of that basin and an agitation means mounted on that gantry for use in agitating a slurry retained within the basin. An air injection system having a plurality of membrane diffusers is positioned within the basin.

19 Claims, 9 Drawing Sheets

OTHER PUBLICATIONS

Brochure: The Wilfley Weber Flotation Cell, Denver, CO.
Brochure: Wilfley Weber, Inc.
DORRCO Technical Manual, Section 32, "Agitator Slurry Mixer", Dec. 1951.
Schematic Drawing of Schreiber Corporation, Inc. (Trussville, AL).
Use of Micro-organisms for Recovery of Metals by O. H. Tuovinen & D. P. Kelley, International Metallurgical Reviews, Review 179, 1974, vol. 19, pp. 21–30.
Article: "Ferrous Iron Oxidation and Uranium Extraction by Thiobacillus Ferrooxidans", by Roger Guay and Marvin Silver, Biotechnology and Bioengineering, vol. 19, pp. 727–740 (1977).
Article: "Microbiological Mining", Scientific American, vol. 247(2), p. 44, 1982, Corale L. Brierly.
Article: Growth Kinetics of Thiobacillus Ferooxidans Isolated from Arsenic Mine Drainage; Joan Forshaug Braddock, Huan V. Juong & Edward J. Brown, published in Applied and Environmental Microbiology, Jul. 1984, pp. 48–55.
Paper: "Continuous VAT Biooxidation of a Refractory Arsenical Sulphide Concentrate", presented at the 17th Canadian Mineral Processor's Conference on Jan. 22–24, 1985, by P. Brad Marchant.
Article: "A New Biotech Process for Refractory Gold-/Silver Concentrates", by R. P. Hackl, F. Wright, and A. Bruynesteyn.

BIOLEACHING APPARATUS AND SYSTEM

This is a continuation-in-part application of U.S. application Ser. No. 005,670 filed Jan. 21, 1987, which is a continuation-in-part application of U.S. application Ser. No. 827,324, filed Mar. 1, 1988 as U.S. Pat. No. 4,728,1082. The disclosures of those applications are hereby incorporated by reference.

BACKGROUND OF THE INVENTION

1. Field: This invention relates to apparatus employable in mineral processing. More specifically, the invention is directed to an apparatus for use in processing ores and concentrates through a technique known conventionally as bioleaching.

2. State of the Art: Bioleaching utilizes the chemical action induced by a species of autotrophic bacteria, e.g. *thiobacillus ferrooxidans* and *thiobacillus thiooxidans,* to process mineral ores and concentrates which are not otherwise efficiently treatable by other conventional methods, such as cyanide leaching. Various approaches involving bioleach based technology are treated in the literature. "Growth Kinetics of *Thiobacillus Ferrooxidans* Isolated from Arsenic Mine Drainage", Joan Forshaug Braddock, Huan V. Luong and Edward J. Brown, *Applied and Environmental Microbiology,* July 1984, pg. 48–55;"Continuous VAT Biooxidation of A Refractory Arsenical Sulphide Concentrate", a paper presented at the Seventeenth Canadian Mineral Processors Conference January 22-24, 1985 by P. Brad Marchant; South African Patent application No. 853701, "Bioleaching Process". by Albert Bruynesteyn, U.S. Pat. No. 2,829,964 (Zimmerley); and U.S. Pat. No. 4,571,387 (Bruynesteyn, et al.). For example, leaching of manganese from manganese ores is described in U.S. Pat. No. 3,433,629 (Iman et al.). A common bioleach approach has employed the use of a cascade system wherein a plurality of processing tanks are arranged in series. The mineral ores being processed are initially introduced into a slurry and then directed from tank to tank during the process whereby the initial substrate concentration is successively reduced to the final desired level in the last tank. A continuous process involving two or more tanks and a means of selectively controlling the level of sulfide within one or more of those tanks is described in "A New Process for Refractory Gold/Silver Concentrates", by R. P. Hackl, F. Wright and A. Bruynesteyn. In this approach, the user may obtain enhanced reaction rates by manipulating the quantity of oxidizable material upon which a generally captive biomass population is permitted to feed.

The chemistry operative in the bioleach process has been explored extensively in the art. Reference is made to "Ferrous Iron Oxidation and Uranium Extraction by *Thiobacillus Ferrooxidans*", by Roger Gray and Marvin Silver, *Biotechnology and Bioengineering,* Vol. 19, pages 727-740 (1977); "Use of Micro-Organisms for Recovery of Metals", by O. H. Tuovinen and D. P. Kelley, *International Metallurgical Reviews,* Review 179, 1974, Vol. 19, pp. 21-31; European Patent Application No. 0004431 of Interox Chemical and Microbiological Mining "Scientific American", Vol. 247(2), pg. 44 (1982) by Corale L. Brierly, which are hereby incorporated by reference.

Previous efforts in providing structures suitable for containing mineral-bearing ores and concentrates have generally been directed to cylindrical tank-like structures. Illustrative of these prior devices are those shown in U.S.S.R. No. 800221 (Ust-Kamenogorsk) and U.S.S.R. No. 899119 (Zhdanov Yul). Manufacturing techniques, together with material and cost considerations, have resulted in structures which are somewhat limited in their ability to process large quantities of ore efficiently and economically. Not only is the requisite processing equipment expensive, but furthermore, the energy required to operate this equipment oftentimes renders it less than cost beneficial.

Operationally speaking, bioleaching requires a generally continuous infusion of oxygen into a slurry which contains the ore being processed, carbon dioxide, water, a species of autotrophic bacteria, and nutrients, e.g. nitrogen, phosphorus, and magnesium for those bacteria. The provision of oxygen to adequately supply the resident bacterial population has previously made necessary the use of energy intensive machinery, e.g., turbines.

In a conventional approach, gas injection nozzles are fitted to a turbine fitted sparger. The nozzles inject oxygen-containing gas into the slurry proximate the rotating blades of a turbine. The blades mix the gas with the surrounding slurry, thereby distributing that gas throughout the slurry. Though mechanically simple in concept, the use of these nozzle/turbine arrangements does involve some disadvantages. First, the energy requirements of such turbines are often so excessive as to render their usage economically unfeasible. Secondly, with increasing tank diameter, turbine mixing becomes unfeasible.

Due to the relatively small surface-to-volume ratio of the coarse gas bubbles produced by the sparger/turbine arrangement, and owing to the disparate specific gravities of the gas bubbles and the slurry, these bubbles oftentimes rise through the slurry and are exhausted to the environment before the oxygen contained therein has been efficiently assimilated by the resident bacteria. The optimal condition appears to be the provision of oxygen in the form of fine bubbles which appear to possess an enhanced capability for assimilation by the bacteria. An increased surface-to-volume ratio and the accompanying enhanced assimilation characteristics of fine bubbles render fine bubbles the preferred alternative over coarse gas bubbles, which for an equivalent mass of air have significant lower surface to volume ratios and assimilation characteristics. Various attempts have been made to achieve the optimal fine bubble aeration condition.

Ust-Kamenogorsk in U.S.S.R. patent No. 800221 suggests the use of a central support having a plurality of outwardly extending radial arms affixed thereto. On the end of each arm is mounted a gas injection nozzle. The nozzles are held rigidly in place by their respective arms so gas (e.g. air) under high pressure may be passed therethrough into a surrounding slurry. The Ust-Kamenogorsk patent relies on the turbulence created by the gas flow to agitate the slurry and thereby retain the solids within that slurry in suspension.

The apparatus disclosed in U.S. Pat. Nos. 4,732,608 and 4,728,082 (Emmett Jr. et al.) relies on a slow moving diffuser arrangement wherein a plurality of upright porous membrane diffusers are rotated within the reactor vessel about a vertical axis. The suspension of the ore and concentrate solids in the slurry is in part achieved in the arrangement by an airlift which draws slurry upward through a hollow, centrally positioned shaft. Upon reaching a selected height above the surface level of the slurry body, the drawn slurry is distributed out over the body of the slurry.

The aforesaid structures are, due to the tank-like nature of their containment vessel, their oxygen introduction systems and their methods of maintaining the mineral-bearing solids in suspension, of necessity limited in the quantity of ore which can be processed over a given time interval. There continues to be a need for an apparatus which is suited for large-scale processing of mineral-bearing solids by means of a bioleaching method whereby the method's oxygen requirements are satisfied while avoiding the process rate limitations engendered by the apparati presently in use.

SUMMARY OF THE INVENTION

An apparatus of this invention for use in bioleach processing of metal-bearing ores and concentrates includes an open basin sized to provide a desired retention capacity. The basin includes a bottom, an inlet and an outlet. The basin is constructed to define a flow path between the inlet and the outlet. The open basin may be constituted of a plurality of parallelly oriented, elongate continuous channels arranged side by side. Each channel is structured to communicate with the channels positioned adjacent thereto. The structure of the channels resembles that of a plug flow type (pipeline) reactor.

An introduction means for introducing an oxygen containing gas into the basin and the slurry contained therein is provided in the basin. Oxygen introduction may be accomplished by means of a plurality of porous membrane fitted diffusers positioned proximate the floor of the basin. Each diffuser defines a diffuser membrane surface which is preferably oriented horizontally whereby oxygen-containing gas being emitted from the surface thereof rises vertically from the diffuser membrane into the slurry resident above the diffuser. The diffusers are supplied with oxygen-containing gas by piping which originates exterior from the basin. Various diffuser configurations are within contemplation. In some constructions, a plurality of individual diffusers are mounted on the bottom of the basin in a generally gridlike array. In alternative constructions, the diffusers may be configured as individual units or segments which are removably disposed on the basin bottom, whereby they can be removed from the basin for purposes of maintenance.

The instant reactor relies primarily on the slurry motion induced by aeration, i.e. the motion of the bubbles as they ascend through the slurry, to maintain the solids and biomass in suspension. This reliance renders the instant reactor most suitable for use with slurries wherein the solids are finely ground and of relatively light specific gravity. These solids conditions contribute to a relatively slow settling rate for the solids. Recognizing that some settling will occur proximate the aeration devices, e.g. the diffusers, especially between adjacent aeration devices, a mechanical means is provided to re-suspend the solids and biomass as needed. This mechanical means is adapted specifically for re-suspending settled solids, thereby hindering, if not precluding, the build-up of those settled solids to a point wherein the operation of the aeration devices is adversely effected.

Re-suspension of the slurry ore or concentrate solids within the slurry may be effected by one or more means. A gantry, having a motor-driven turbine affixed thereto, is mounted atop the sidewalls and is adapted to be displaced along the length of the basin. The turbine is positionable within the slurry resident within the basin and is operable to direct a large volume flow of slurry downward toward concentrations of solids which may have settled on the bottom floor of the basin. This flow is directed to break up accumulations of settled solids and functions to re-suspend them in the slurry. Further, the turbine is adapted for use in periodic stirring of the slurry within the basin to reduce the deposition of solids after removal of an aeration segment for maintenance purposes. By this means the user can compensate by mechanical mixing means for the mixing action which would hopefully have been provided by the aeration device. This approach permits the user to continue the effective operation of the reactor notwithstanding the maintenance-related removal of some of the aeration devices.

The basin may be configured to provide for the recycling of slurry and attached biomass from one or more selected locations within the basin back to the inlet of the basin. Preferably, slurry is withdrawn from locations within the basin having the highest active biomass population density, e.g. proximate the outlet. The recycled slurry is injected into the incoming slurry and functions as an inoculant for incoming material. The recycled slurry also allows the reactor to avoid the phenomenon known as biological "wash-out". Washout occurs when a quantity of feed slurry over and above the regular input feed amount is introduced into the basin contained slurry. The excess slurry forces a corresponding quantity of slurry prematurely outward through the basin outlet. This quantity of slurry, having not had the requisite resident time in the basin, has yet to reach the desired oxidized condition. The recycling means of the invention permits the user to return the incompletely oxidized quantity of slurry back to the inlet, thereby directing that slurry through the basin again to achieve the desired oxidized condition. The recycling of slurry may be accomplished by pumps and associated piping adapted to withdraw slurry from one or more selected locations and transfer the withdrawn slurry to the inlet.

A byproduct of the aeration occurring within the open channel is the discharge of a saturated mist from the surface of the slurry. Due to reactions taking place within the slurry, the mist may be impregnated with acidic and/or toxic compounds, e.g sulfuric acid and arsenic acid. The invention includes a means adapted for containing the mist in order to lessen, if not preclude the possibility of a release of contaminants to the environment. In one embodiment, the basin is fitted with a bubble-like cover which extends thereover. The configuration of that cover may vary from one construction which utilizes an air inflated cover, to other constructions which anticipate a fabric, non-porous membrane cover being suspended from cantilevered supports anchored to the sidewalls of the basin. Alternatively, the invention discloses the use of a blanket having a specific gravity sufficiently low so as to ensure that it floats on the surface of the slurry, thereby trapping the reactant emissions between the surface of the slurry and the underside of the floating blanket. In some constructions, the blanket is made sufficiently porous that emission gases can pass through the blanket, but only after having given up their pollutants through condensation to the blanket itself.

DETAILED DESCRIPTION OF THE DRAWINGS

Figure 1:
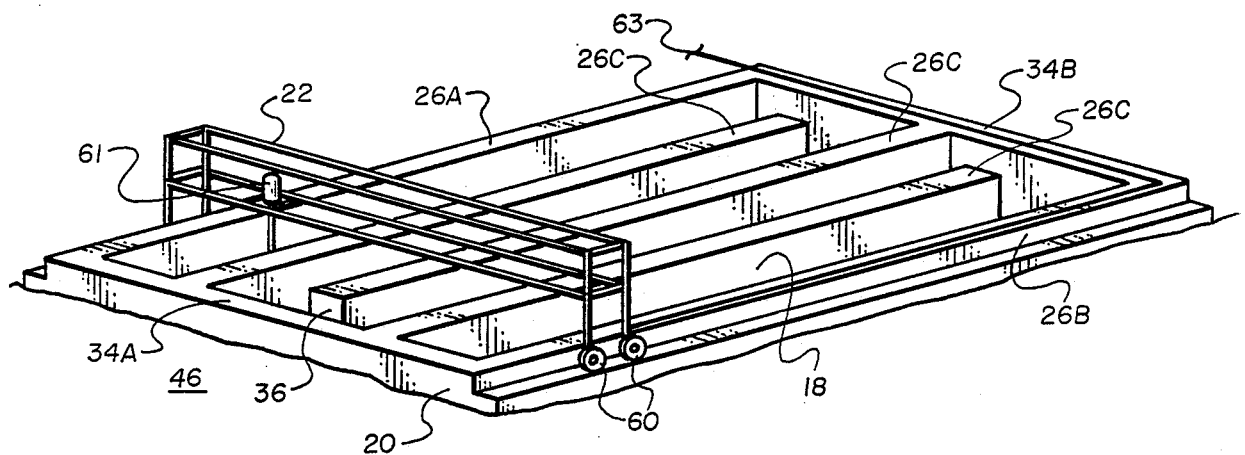
FIG. 1 is an elevated perspective view of an open basin reactor having a movable gantry mounted thereon. The center wheel assembly of the gantry has been removed for clarity purposes.

The reactor 18 illustrated in FIGS. 1-5 includes a slurry containment basin, generally 20, in association with a gantry 22 positioned atop the basin 20 and adapted to be displaced along the length of the basin 20.

The basin 20 as illustrated is constructed of a plurality of elongate, and generally linear, open channels 24, each channel being formed by the union of two upright sidewalls 26 and a horizontally oriented bottom or floor 28. The sidewalls 26 and floor 28 are generally planar in construction and present smooth, non-porous liquid impermeable and acid resistant exterior surfaces. Each channel 24 includes a longitudinal axis 30 and is generally "U" shaped in cross-section.

Figure 5:
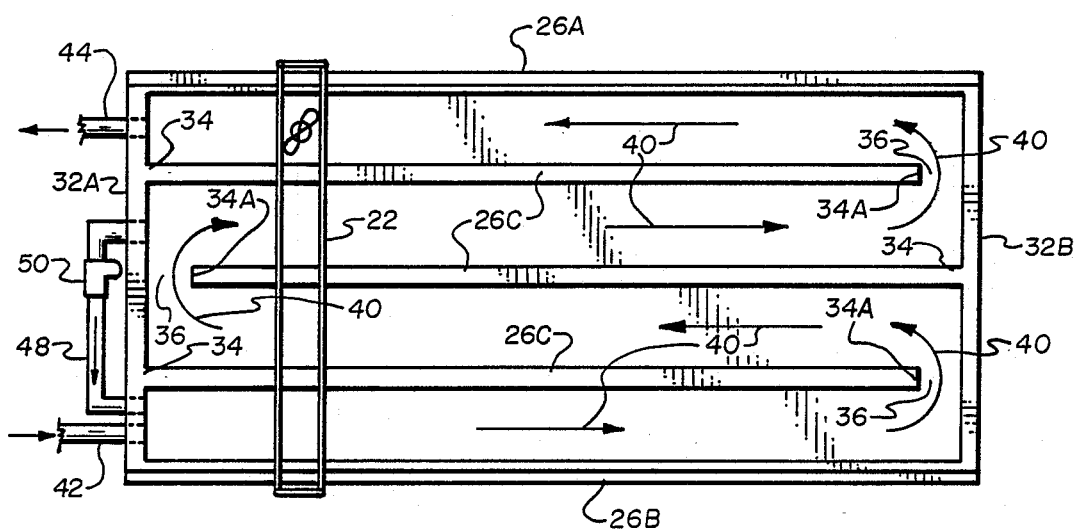
FIG. 5 is a top view of the reactor illustrated in FIG. 1.

The channels 24 are positioned side by side whereby the longitudinal axes 30 are oriented parallel to one another. As illustrated in FIG. 5, the outermost sidewalls 26A and 26B are sealedly mounted at their ends to a pair of endwalls generally 32 and individually identified as 32A and 32B which are positioned spacedly apart from one another and oriented parallel to one another. Similar to the sidewalls 26 in their construction, the endwalls 32A and 32B are elongate and present a generally planar construction having smooth, liquid impermeable acid resistant interior surfaces. The association of the sidewalls 26A and 26B, floor 28, and endwalls 32A and 32B form a generally open, box-like basin adapted to receive and retain a liquid slurry which contains water, carbon dioxide, a species of autotrophic bacteria, e.g. *thiobacillus ferrooxidans* and *thiobacillus thiooxidans*, nutrients for the bacteria, e.g phosphorus nitrogen, and magnesium. The basin 20 is constructed to also retain the by-products created by the oxidation reactions induced by the bacillus within the slurry.

Each of the sidewalls 26 which are positioned between the sidewalls 26A and 26B are sealedly mounted to one and only one endwall e.g. endwall 32A and/or endwall 35B, at an end 34 thereof. The opposing end 34A of each sidewall 26C is spacedly positioned away from the opposing endwall 32 so as to define a passageway 36 between the end 34A of the sidewall and the endwall 32. For example, a given sidewall 26C is mounted sealedly to endwall 32A at its end 34 but its opposing end 34A is not mounted to the opposing endwall 32B. This passageway 36 provides a flow conduit or communication between a pair of adjacent channels 24 which are in part defined by a respective shared sidewall 26C. As shown by FIG. 5, the passageways 36 are located at alternating ends of the basin 20 to thereby define a sinuous flow path (illustrated by arrows 40) which follows a course through the reactor channel from the inlet 42 to the outlet 44.

The sidewalls 26, floor 28 and endwalls 32 may be constructed of concrete or any other rigid material. In a preferred construction, the basin 20 is constructed within an excavation within the ground 46. Due to the acidic nature of the oxidation by-products which are produced during the reactor's operation, the surfaces of the basin 20 which are exposed to those by-products must be acid proof. The use of acid-resistant concrete or cement is recommended for constructing the basin. Additionally, the basin should be coated with a protective coating or lined with a double liner fabricated from polyethylene or other synthetic material which is acid resistant and which conforms to Environmental Protection Agency standards for hazardous material containment structures.

Each of the channels 24 may be fitted at selected locations with conduit piping 48 which is shown as passing sealedly through endwall 32A. This piping 48 is adapted to draw off a quantity of slurry from the respective channel 24 and recycle that slurry back to the inlet 42 of the reactor. Alternatively, the piping 48 may be laid out to facilitate its being used to advance or recycle the drawn off quantity of slurry to a preselected location within the reactor.

The recycling of slurry back to the reactor inlet provides an inoculant for the feed material which is introduced into the reactor. The drawn off slurry, having an active resident bacteria population, can thus be used to seed the incoming ore or concentrate solids with the oxidizing agent bacteria. A pump 50 may be mounted within an outline of the piping circuit to transfer the drawn off quantities of slurry through the piping 48.

Figure 4:
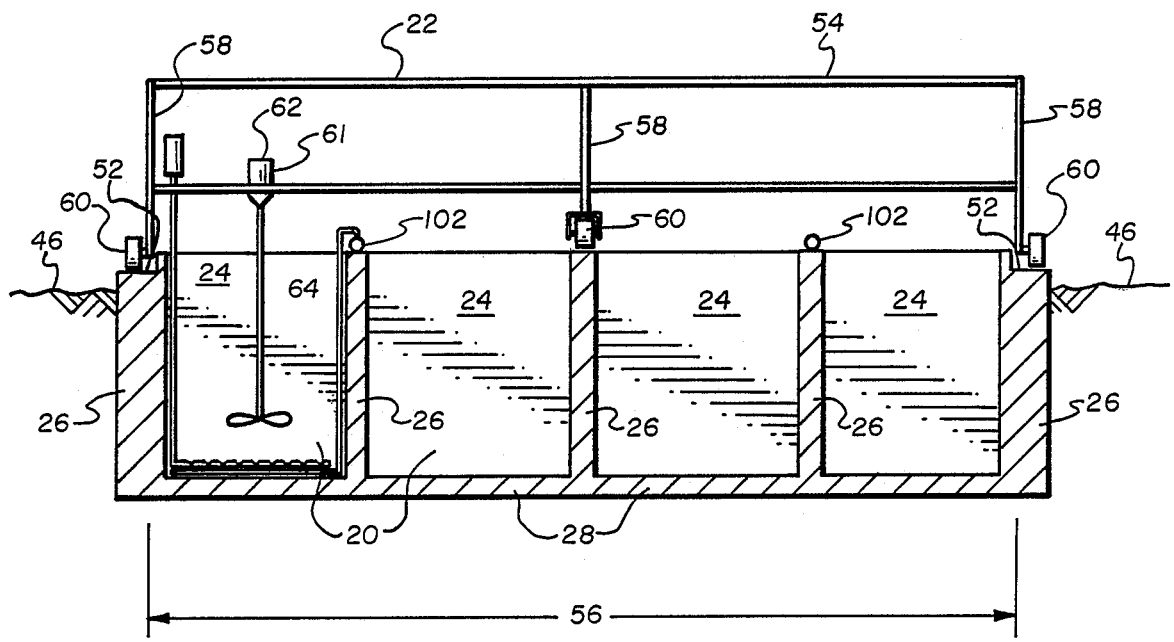
FIG. 4 is a cross-sectional view of the reactor shown in FIG. 1.

As shown to advantage in FIG. 4, the sidewalls 26A and 26B may be configured to support a pair of guide tracks 52, adapted for forming a path for the reciprocal movement of gantry 22 along the length of the basin 20.

Gantry 22 includes an elongate frame structure 54 dimensioned to extend across the width of the reactor basin 20. The frame structure 54 includes a plurality of upright legs 58 shown supported on each sidewall. Each leg 58 includes a rotatably mounted wheel 60 adapted for rolling engagement along guidetrack 52.

Various structural configurations of the gantry frame structure 54 are within contemplation. The embodiments of the frame structure 54 as depicted respectively in FIGS. 1, 5, 6, and 7-10 are merely illustrative.

Figure 6:
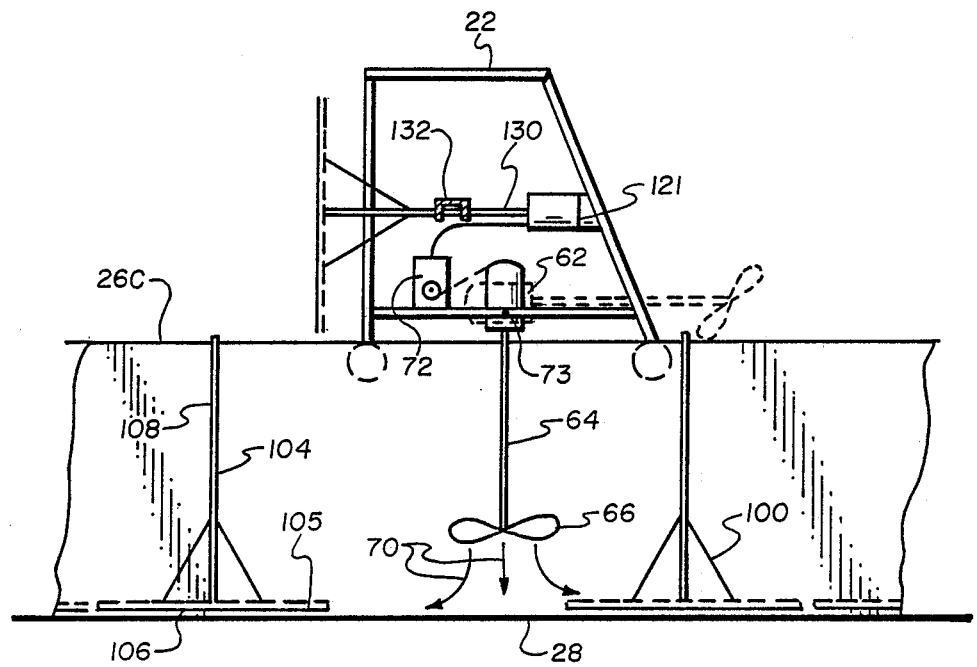
FIG. 6 is a side view of a gantry adapted with a motor driven turbine, mounted above an open basin having a plurality of diffuser segments positioned therein.

Mounted within the frame structure 54 is a carriage 60 which is slidably mounted on the two longitudinal side rails 55 of the gantry. Mounted on carriage 60 is an agitation unit 61 which includes an engine or motor 62 fitted with a drive shaft 64. The agitation unit 61 is mounted to the carriage by two oppositely extending bolts 65 which extend outwardly from the unit 61 and are rotatably received in respective registered apertures of two parallelly and spacedly mounted brackets 65. The brackets 63 are mounted on carriage 60. Resultingly, the agitation unit 61 is made rotatable in a vertical plane, i.e. about a horizontal axis 67 as defined by the bolts 63. Engine 62 is preferably an electrical motor which is supplied with electrical power by cable 63. As shown, cable 63 extends along the length of the gantry 22 and along a portion of the perimeter of basin 20, eventually being connected to an external power source (not shown). Mounted on the end of drive shaft 64 is a turbine blade 66. Turbine blade 66 as shown in FIGS. 4 and 6 is removably positioned within a channel 24 and above the floor 28 of that channel. Upon activation of motor 62, the blade 66 induces a flow of slurry downward toward the floor 28 of the channel in the directions shown generally by arrows 70. The motor 62 is of sufficient horsepower rating to induce a volume of slurry flow sufficient to disrupt accumulations of solids which may have settled on the floor 28 of the channel 24. Generally the turbine will be designed for operation under low shear conditions, i.e. with a large diameter and low speed operational capability.

The carriage 60 may be fitted with a conventional winch 72 which is mechanically associated with the agitation unit 61 by means of a cable 69.

Figure 8:
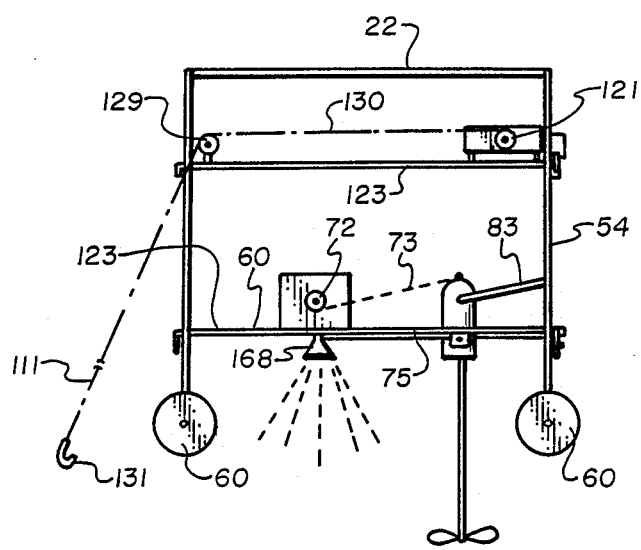
FIG. 8 is a side elevational view of the gantry shown in FIG. 6.
Figure 9:
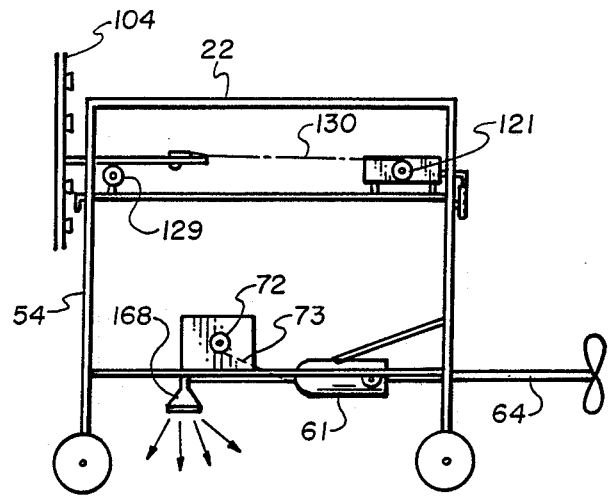
FIG. 9 is a side elevational view of the gantry of FIG. 6 wherein a diffuser unit is shown being carried by the gantry.

Referring to FIGS. 8 and 9, this winch 72 is connected to agitation unit 61 by cable 73 and adapted to pivot the unit 61 counterclockwise to the orientation shown in FIG. 9 whereby the turbine blade 66 and shaft 64 are elevated sufficiently above sidewalls 26 that the carriage may be displaced longitudinally along the length of gantry 22 without the blade and shaft contacting the sidewalls. The carriage 60 is furthermore mounted on frame 54 to be slidable along the length thereof, whereby the user may displace the agitation unit 61 along that length to a preselected location above a selected channel 24. In one embodiment, the lower longitudinal frame rails 55 of the gantry 22 form a track guide which extends along the longitudinal width of the gantry. The lateral cross members 75, form the carriage 60 and support the agitator unit 61, extend from one frame rail 55 to the other. The cross members 75 are placed atop the frame rails so as to be slidable along the upper surface of those frame rails lo along substantially the entire length of the gantry 22. A motor 80 having a toothed sprocket gear mounted thereto is mounted on one end of a side rail 55. An idler sprocket gear 83 is rotatably mounted on the opposing end of the rail 55. An endless chain 82 is trained about the two sprocket gears. A bracket 84 connects the carriage 60 to the chain 82. The motor 80 may be driven one direction and alternatively reversed to go the opposing direction, thereby displacing the carriage along the length of the gantry to any selected location thereon. The agitator unit 61 may be displaced along the gantry to a location above a selected channel 24. The unit 61 may thereafter be reoriented to its upright position and operated to stir the slurry in the selected channel 24. A resilient coil spring 83 or other return means is mounted on carriage 60 so as to oppose the force of the winch cable 69 on the agitation unit 61. As a result, when the force created by that cable on the unit 61 is released, the spring returns the unit 61 to its upright orientation as illustrated in FIG. 8. The side rails 55 form a guide track within the frame structure 54 over which the carriage 60 may travel from one channel 24 to another. The user may utilize this particular feature of the invention to disrupt solid material accumulations within any of the channels 24 by merely moving the gantry 22 to a position over and atop the accumulation area and positioning the unit 61 within the slurry above the accumulation and actuating the drive motor 62.

Figure 10:
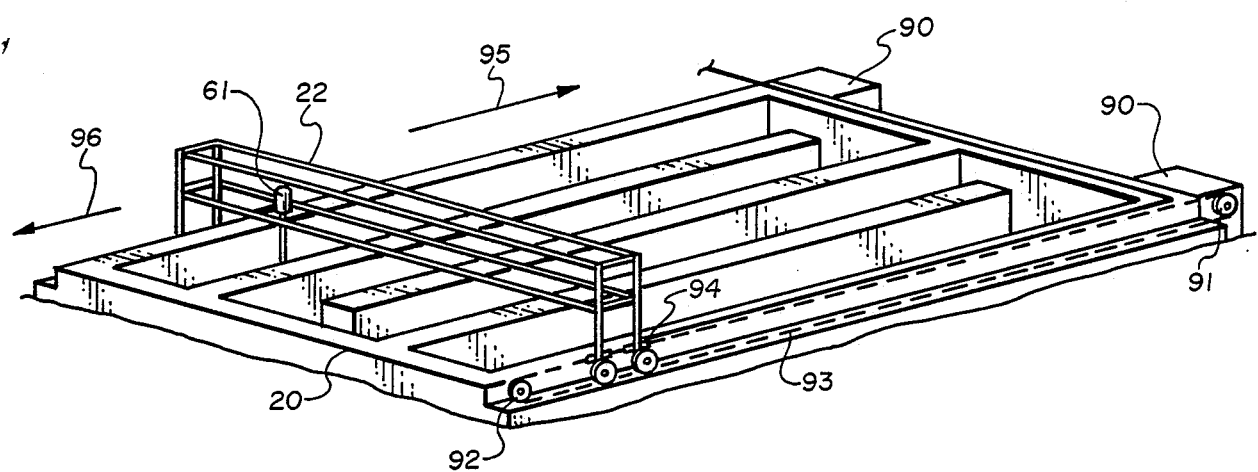
FIG. 10 is a perspective view of a basin and gantry illustrating the gantry transport means.

The gantry 22 may be displaced along the guide tracks 52 in a variety of ways. As illustrated in FIG. 10, two electric motors 90 may be mounted to the basin 20, one motor being positioned at each of the opposing ends of an endwall 32A. Each motor 90 includes a toothed sprocket gear 91 adapted to be rotated upon actuation of motor 90. A second toothed sprocket gear 92 is rotatably mounted on each of the sidewalls 26A and 26B. Each sprocket gear 92 is located proximate the intersection of its respective sidewall and the endwall 32B. Each sprocket gear 92 is mechanically associated with a respective sprocket gear 91 by means of an endless chain 93 which is trained over each pair of gears 91 and 92. Each end of the gantry is detachably mounted to a respective chain 93 by means of a bracket 94. The motors 90 are synchronized whereby a user may actuate the motors to cause the chains to either displace the gantry in the direction indicated by arrow 95 or alternatively, the motors can be reversed to direct the gantry in the direction indicated by arrow 96. Utilizing the motors, the user can position the gantry over any selected location along the length of the basin 20.

The air injection means, generally 100, of the invention includes a plurality of pipes 102 which are mounted to extend along the top surfaces of the channel-forming sidewalls 26. Each pipe 102 is connected by means of auxiliary piping 103 to a plurality of diffuser units 104 located within one or more of the channels 24. Pipes 102 are adapted to receive a pressurized flow of oxygen-containing gas (e.g. air) from an external source (not shown) and thereafter transfer that gas to the diffuser units 104. Pipes 102 may be fabricated form polyvinyl chloride. As shown, each diffuser unit 104 includes a support structure 105. Support 105 consists of a plurality of plastic-coated steel or stainless steel "I"-beam members 107 mounted end to end to form a frame. A plurality of cross braces 108 mounted to extend between the members 108 form a platform within said frame.

A plurality of porous membrane diffusers 109 are mounted on auxiliary piping 103 which in turn is mounted to the base support structure 105. Each diffuser 109 has a porous membrane 110 diffuser surface positioned in a generally horizontal orientation. As shown, each diffuser membrane presents a generally planar, disc-like appearance. It should be understood that various other membrane configurations and orientations are likewise employable in the invention, e.g. the membrane 110 may have a curved appearance or a semi-spherical appearance. Alternatively, the diffuser membrane may be oriented upright, or oriented angled to the horizon. Each diffuser membrane is mounted to a frame 106 which holds the membrane in place, both locationally as well as configurationally. In preferred embodiments, a porous, flexible membrane having a flexible structure is used e.g. polypropylene felt or elastomeric rubber. The flexibility of the diffuser permits the user to flex the membrane 110, e.g. by injecting a high pressurized air flow through the membrane, in order to dislodge and discharge solids which may have collected upon the pores of the membrane.

Each diffuser 109 is connected by a sealed fitting to a respective gas supply conduit, i.e. auxiliary piping 103. Gas (e.g. air) is directed from an external supply (not shown) through the piping 103 then outward through the porous membrane 110 into the slurry within the basin 20.

Figure 13:
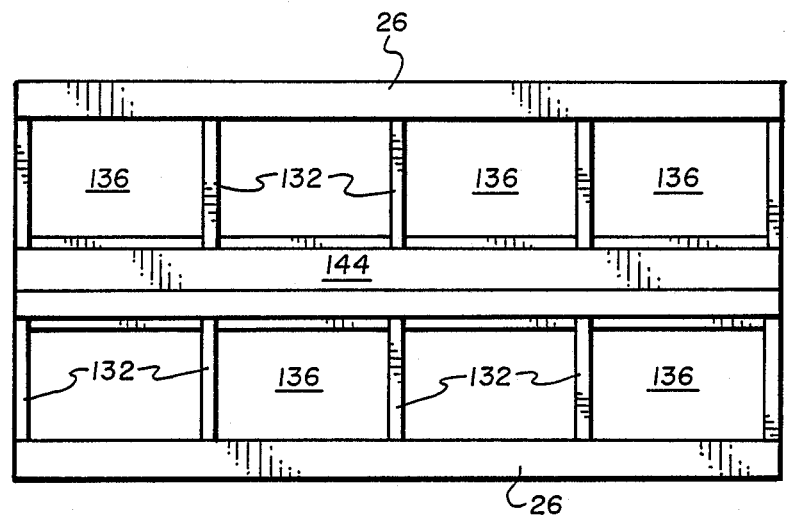
FIG. 13 is a top view of the reactor basin cover shown in FIG. 11.
Figure 14:
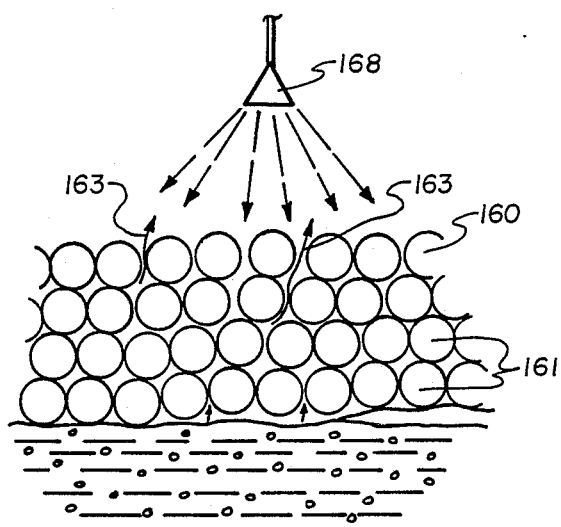
FIG. 14 is a sectional elevated cross-sectional view of a fourth embodiment of a containment cover.

The individual diffuser membranes 110 may be positioned on the support structure 105 in a grid-like array as shown in FIG. 13.

Figure 7:
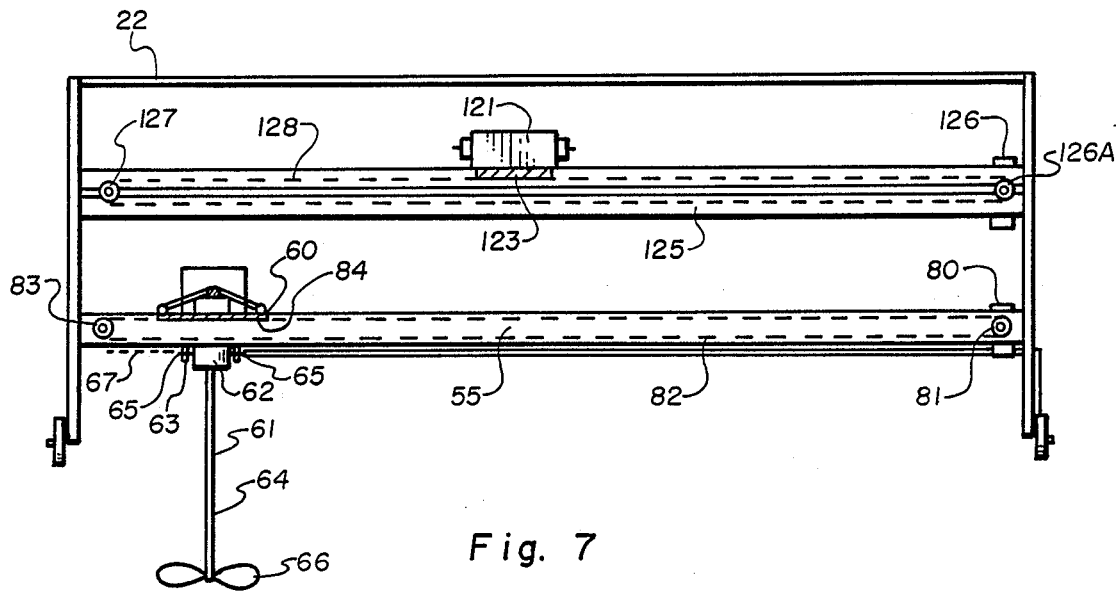
FIG. 7 is a front elevational view of a gantry of the invention.

The extension member 108 extends upwardly through the height of the channel 24 sufficiently to be grasped by a lifting means generally 111 mounted on the gantry 22. As shown in FIG. 7-9, the gantry may include a hoist 121 or other mechanical lifting apparatus suited to raise an individual diffuser unit 104 out of its channel 24 for purposes of servicing it. The hoist 121 includes a cable 130 together with an attachment member 131 adapted to intercooperate mechanically with the extension 108 to facilitate the latter being raised by activating the hoist. As shown, attachment member 131 may be a conventional hook. Extension 108 is configured with an aperture dimensioned to detachably receive and retain the hook.

Hoist 121 is mounted to a carriage 123 which is positioned on side rails 125 to be slidably displaceable therealong. As shown, a motor 126 having a toothed sprocket gear 126A mounted thereon is mounted at one end of a side rail 125. A rotatably toothed sprocket gear 127 is mounted on an opposing end of side rail 125. An endless chain 128 is trained over the two sprocket gears 126A and 127. The carriage 123 is attached to the chain 128 by a bracket 128. Upon the actuation of the motor 126, the carriage may be displaced in either direction along the length of the gantry by appropriate manipulation of motor 126.

Cable 130 is trained over a pulley 129.

Figure 2:
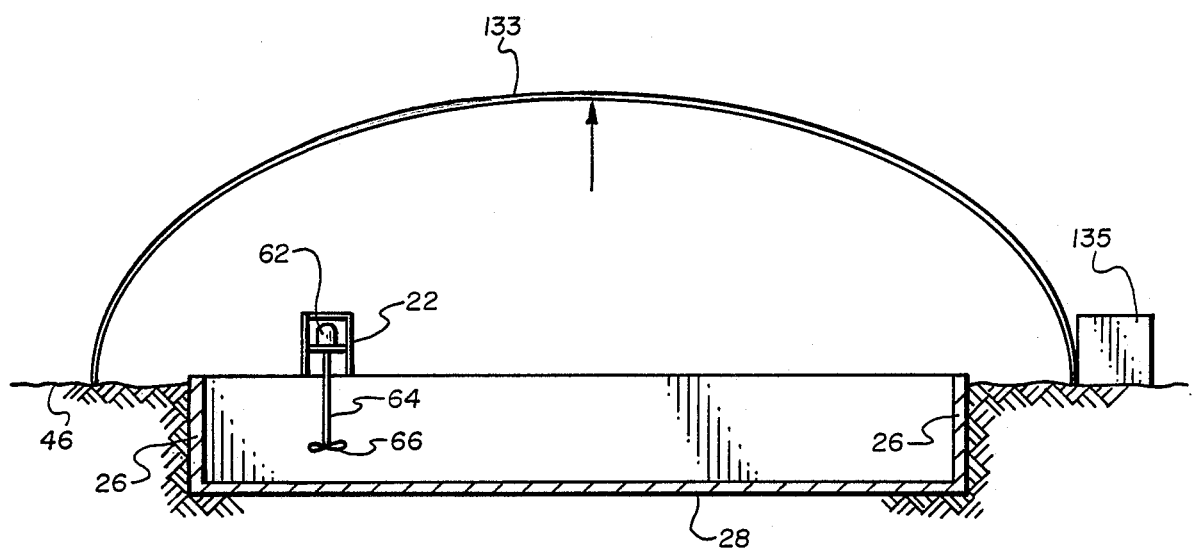
FIG. 2 is a cross-sectional view of a reactor basin having a bubble-like containment means mounted thereabove.
Figure 3:
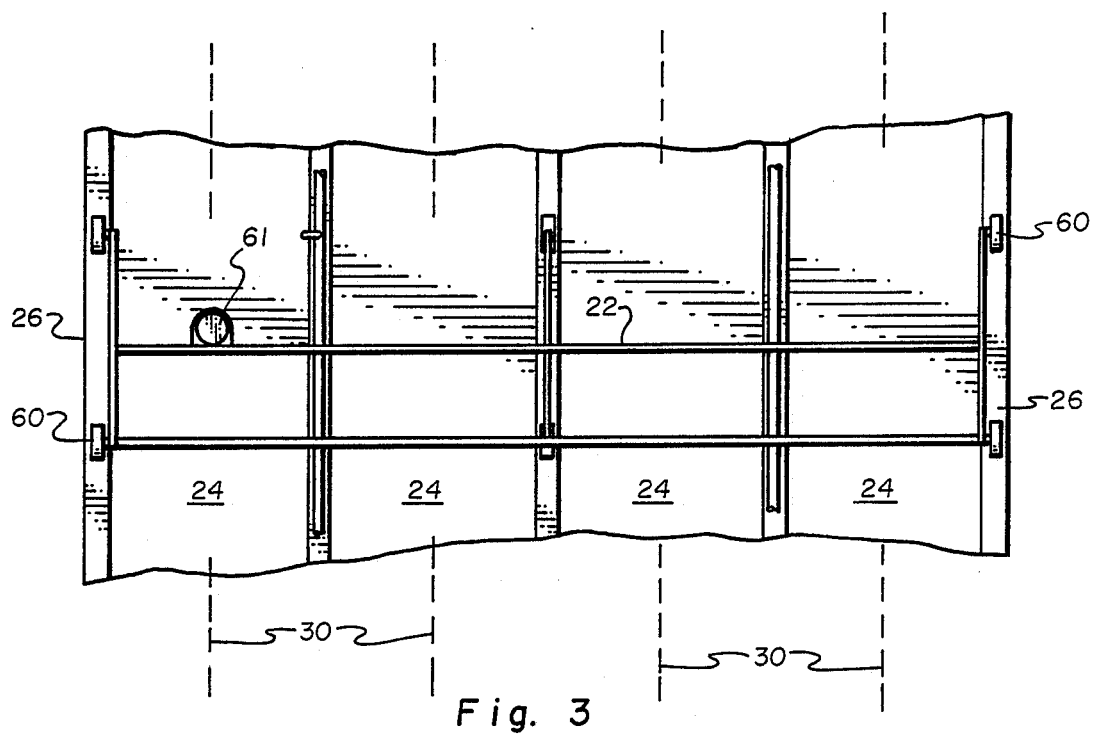
FIG. 3 is a sectional top view of the rector illustrated in FIG. 1.

Due to the Chemical reactions occurring within the basin 20, gaseous by-products, many of which may be pollutants, are given off. The invention provides a means of substantially reducing, if not containing, these by-products by placing a containment cover over the open top of the reactor basin 20. As shown in FIG. 2, one embodiment utilizes a substantially dome-like cover 133. In other embodiments, the cover 133 may be a semi-circular, cross-sectioned, elongate structure. This cover may be an inflatable-type cover of the type conventionally used to cover tennis courts, swimming pools and other similar recreational sites. Covers of this construction typically include a plurality of sealable air-tight compartments oriented adjacent one another which, upon being filled with air, form a semi-rigid self-supporting structure.

A conventional scrubber 135, adapted for removing pollutants from the air, is fitted to the cover for processing air leaving the bubble, thereby substantially removing the pollutants therefrom.

Figure 11:
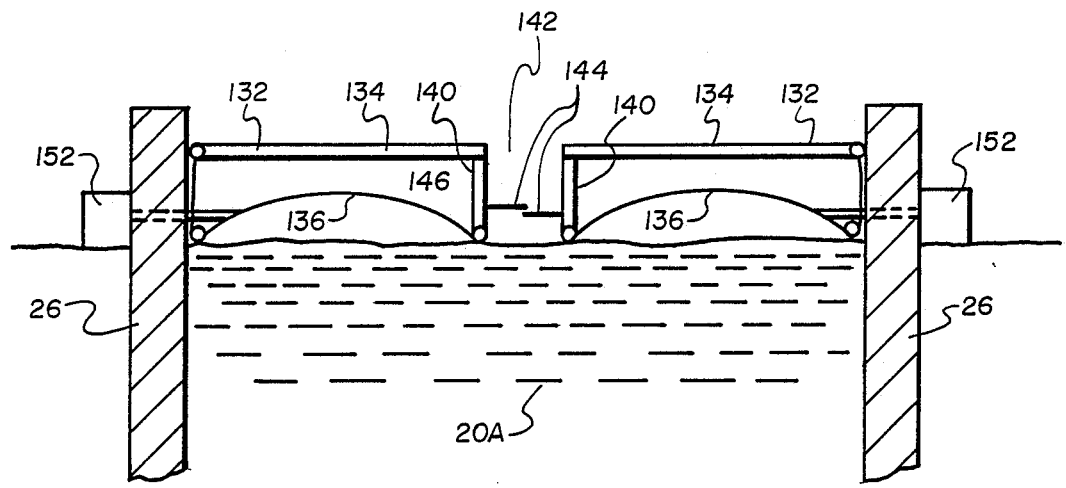
FIG. 11 is a cross-sectional view of a reactor basin fitted with a second embodiment of a containment
Figure 12:
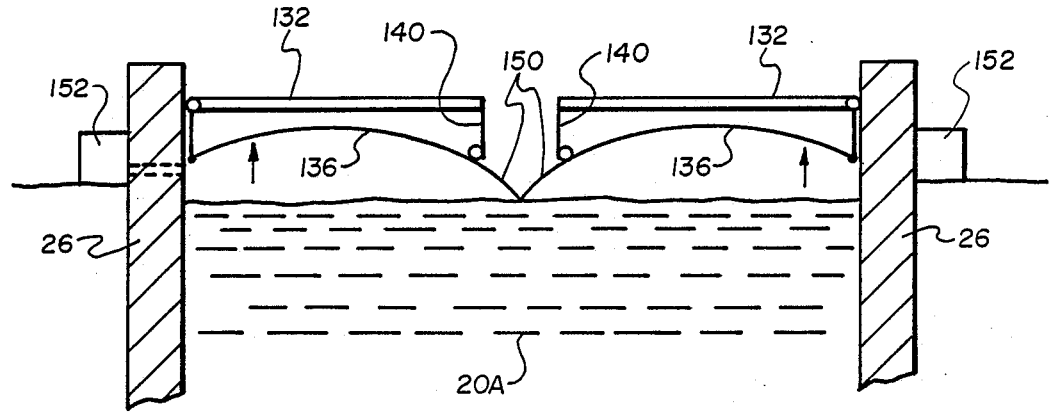
FIG. 12 is a cross-sectional view of a reactor basin illustrating a third embodiment of a containment

FIGS. 11 and 12 disclose a two-segment reactor cover generally 134 wherein a plurality of cantilever supports 132 are hingedly mounted spacedly along a channel sidewall 26 to extend into the channel 24A. Each support 132 may be a single, solid elongate member which extends along the length of the channel 24A or, alternatively, each support 132 may be an "L"-shaped framework. Each support 132 extends across the width of its respective channel 24 somewhat less than half of the width of that channel. As shown, each support is hingedly joined to the sidewall 26, whereby the support may be pivoted outwardly from the channel 24 in the direction indicated by arrow 133, thereby opening the channel 24 for an access for maintenance and service purposes. Suspended from that support 132 is a flexible non-porous membrane 136 which is supported to form an elongate, dome-like cover over the open channel 24A. Each membrane 136 extends from the sidewall 26 to approximately the median of the channel 24. In the embodiment illustrated in FIGS. 11 and 13, the edge of each membrane 136 is attached to a downwardly extending extension 140 of the support 132. Each pair of opposing extensions 140 are mounted spacedly apart to define a passageway 142 therebetween. This passageway is dimensioned to permit the passage therethrough of the mixing unit 61. In order to substantially confine the reaction by-product gases rising from that portion of the slurry located within the passageway 142, a two-part, flap-like auxiliary cover 144 is provided. The auxiliary cover 144 is formed by a pair of flexible, yet somewhat rigid covers 146, one of which covers 146 is mounted to and extends laterally from each of the extensions 140. Each cover 146 extends outwardly slightly over half of the width of the passageway such that the covers 146 overlap one another proximate the central region of the passageway 142. The covers are adapted to separate from their overlapping orientation upon the passage of the mixing turbine through the passageway. Upon the passing of that turbine, namely the drive shaft 64, the covers 146 return to their overlapping orientation, which ensures a generally airtight seal over and atop the open passageway 142.

FIG. 12 illustrates a modified cover construction adapted for placement within the passageway 142 formed by the extensions 140. As shown, a pair of covers 150 which are either extensions of membrane 136 or alternatively, separate covers which are fixed to the ends of extensions 140 are oriented to extend outwardly each from a respective extension 140 and downwardly toward the surface level of the slurry within the channel 24A. The covers 150 intersect one another at the surface level of the slurry thereby forming, in conjunction with membranes 136, a pair of elongate covers which extend over the open channel along the entire length of the channel 24A. As shown in both FIGS. 11 and 12, the cover has a generally arc-like configuration in cross-section.

A scrubber 152 is fitted to each cover to receive and process the air removed from beneath the cover in order to substantially reduce the level of pollutants in that air prior to its release to the environment.

FIGS. 14-17 illustrate an alternative blanketlike cover 160 adapted for use over an open channel 24 of the basin 20.

As shown, each blanket 160 includes a plurality of small media 161 having a specific gravity sufficiently low as to ensure that the media float on the surface of the slurry within the channel 24. In FIG. 13, the media are a plurality of small, hollow plastic spheres 161. The spheres 161 do not form a sealed, impermeable cover. Though adjacent spheres may or may not be physically adhered or joined together to form a cohesive structure, a prerequisite of the invention is a plurality of passageways 163 through the thickness of the blanket through which air rising from the slurry may pass. The spheres 161 operate as condensation sites upon which mist, containing pollutants rising from the slurry, may condense. The thickness of the blanket 60 is adjusted by varying the numbers of spheres 161 to provide a sufficient opportunity for the pollutant carrying mist to condense before it has passed entirely through the blanket 160. A periodic or continuous water spray nozzle 168 is positioned over and atop the blanket 160 to provide a means of washing down the blanket 160 and directing condensate which has collected on the spheres back into the slurry. The spheres provide a surface on which the mist within the air being discharged from the slurry can condense.

Figure 15:
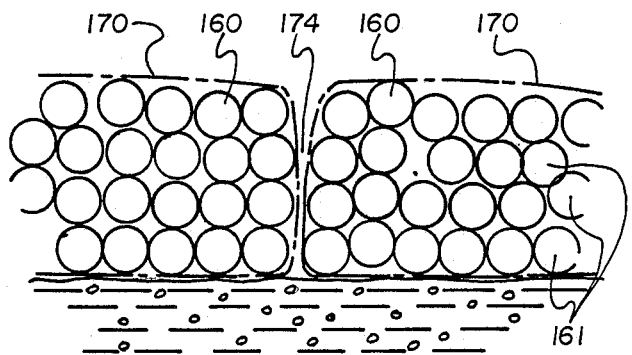
FIG. 15 is a sectional elevated cross-sectional view of a modified version of the containment cover shown in FIG. 10.

In FIG. 15, an alternative embodiment of the blanket cover 160 is shown. The plurality of plastic spheres 161 is separated into two definable groupings by the use of flexible open screen mesh 170. The mesh 170 is formed into two coverlets dimensioned to contain a quantity of spheres. Though the coverlets are positioned contiguous one another, the interface 174 of the coverlets is adapted to permit the passage therebetween of the drive shaft 64 of the mixing turbine. Since the mesh is porous, a water spray similar to that illustrated in FIG. 14 may likewise be used with the blanket in order to return pollutants carried in the mist rising from the aerated reactor slurry back to that slurry.

The use of the mesh coverlets not only permits the mixer turbine drive shaft to pass through the blanket 160, but more importantly, the coverlets permit the easy removal of the media from the reactor for purposes of cleaning and maintenance.

Figure 16:
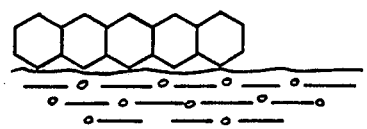
FIG. 16 is a cross-sectional view of a fifth embodiment of a containment cover.
Figure 17:
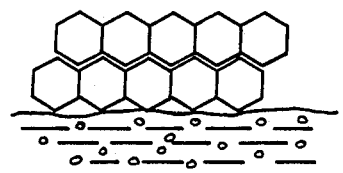
FIG. 17 is a cross-sectional view of a modified embodiment of the containment cover shown in FIG. 11.
Figure 18:
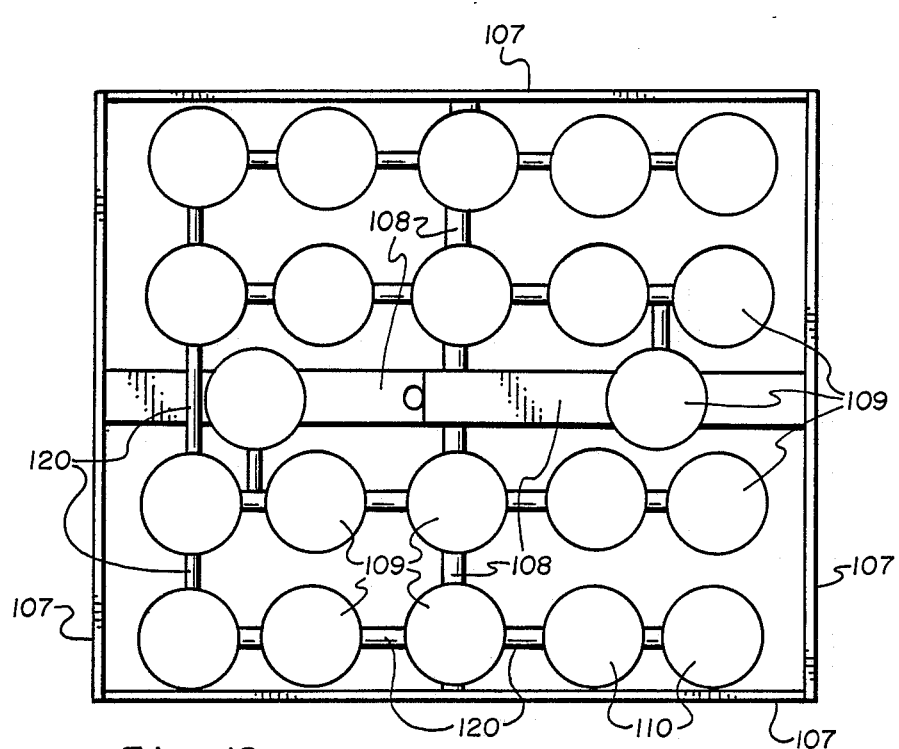
- FIG. 18 is a top of a diffuser segment or platform.
Figure 19:
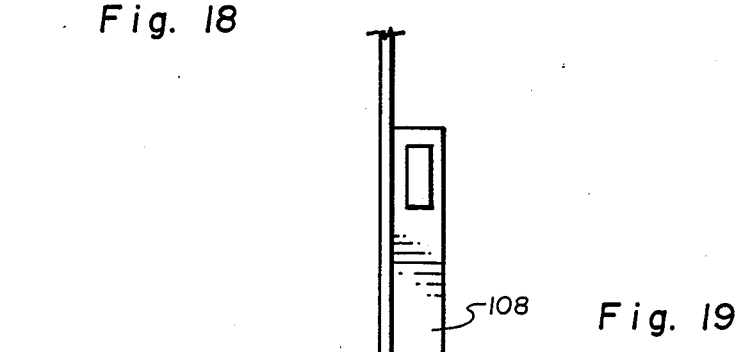
FIG. 19 is a side view of the diffuser segment shown in FIG. 17.
Figure 20:
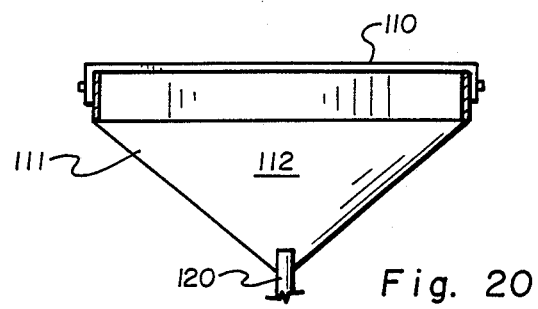
FIG. 20 is a cross-sectional side view of an individual diffuser.

FIGS. 15-17 illustrate the use of a single or multilayers of icosahedron-shaped media in place of the spherical media. The structure of the icosahedron-shaped media is adapted to facilitate the interlocking of adjacent media, thereby limiting the size of the passageways between adjacent media. As with the above-described blankets of FIGS. 15-17, a spray wash can be used in conjunction with the blankets of FIGS. 15-172 to retard any release of pollutants.

It is to be understood that the embodiments of the invention herein described are merely illustrative of the application of the principles of the invention. Reference herein to details of the illustrated embodiment is not intended to limit the scope of the claims which themselves recite those features regarded as essential to the invention.

What is claimed is:

1. A reactor for use in processing metal-bearing solids through use of a bioleaching process, said reactor comprising:
    an open basin adapted to retain a quantity of metal-bearing concentrate slurry, said open basin having a bottom, an inlet and an outlet, said open basin including a plurality of linear, elongate channels positioned adjacent and parallel one another, at least on of said linear, elongate, channels communicating at each of its opposing ends with a respective linear, elongate channel positioned adjacent thereto, said open basin defining a flow path between said inlet and said outlet;
    an oxygen introduction means, positioned within said open basin proximate said bottom, for injecting an oxygen containing gas into said slurry within said open basin;
    a gantry, mounted atop said open basin for movement along a length of said open basin; and
    an agitation means, mounted on said gantry for movement therewith, for re-suspending coarse solids which have settled on said open basin bottom proximate said oxygen introduction into said metal-bearing concentrate slurry.

2. The reactor according to claim 1 wherein said oxygen introduction means includes at least one porous membrane diffuser positioned in a generally horizontal orientation.

3. The reactor according to claim 2 wherein said porous membrane is planar in configuration.

4. The reactor according to claim 1 wherein said agitation means is a driven turbine.

5. The reactor according to claim 1 wherein a gas impermeable containment means is mounted over and above said open basin for containing reactant gas produced within said open basin.

6. The reactor according to claim 5 wherein said gas-impermeable containment means is an inflatable cover wherein said inflatable cover is maintained inflated by said oxygen-containing gas introduced into said slurry by said oxygen introduction means.

7. The reactor according to claim 5 wherein said gas-impermeable containment means is a semi-spherical cover.

8. The reactor according to claim 6 wherein said inflatable cover is retained in position by a frame mounted over and above said inflatable cover.

9. The reactor according to claim 5 wherein said gas-impermeable containment means comprises:
    a pair of upright supports mounted spacedly apart on opposing sides of said open basin;
    at least one pair of extensions, one of said extensions being mounted on each of said upright supports to extend outwardly therefrom over and above said open basin;
    an elongate convex gas impermeable cover suspended from each said extension, each said elongate, convex gas-impermeable cover extending over said open basin to contain and confine reactant gases given off from said open basin;
    where in said upright extensions are positioned to define a passageway therebetween sized to permit passage therethrough of said gantry and said agitation means.

10. The reactor according to claim 9 wherein a gas impermeable flap-like member is mounted on each extension to extend outwardly therefrom toward an opposing extension, said flap-like members overlapping one another proximate their ends to form a generally sealed cover over said passageway; said flap-like members being adapted to disengage from one another to permit a passage through said passageway of said gantry and agitation means.

11. The reactor according to claim 1 wherein said open basin has a recirculation means adapted to draw off slurry from selected locations within said open basin and return said withdrawn slurry to said basin inlet.

12. The reactor according to claim 2 wherein said diffuser membranes are fabricated from an elastomeric material.

13. The reactor according to claim 5 wherein said containment means is comprised of a blanket adapted to float atop said slurry within said basin.

14. The reactor according to claim 13 wherein said blanket is formed of a plurality of hollow plastic spheres.

15. The reactor according to claim 13 wherein said blanket is formed of a plurality of polyhedron media.

16. The reactor according to claim 13 wherein said blanket is comprised of two separate and contiguous sections formed to separate one from another to permit a passage therebetween of said gantry and said agitation means.

17. The reactor according to claim 13 wherein a spray means for spraying water and thereby rinsing said blanket is provided above said blanket.

18. The reactor according to claim 2 wherein said gantry is adapted with lifting means for lifting said diffusers out of said open basin.

19. The reactor according to claim 1 wherein said open basin is formed of a series of open, elongate, linear channels, arranged parallel and adjacent to one another, each elongate, linear channel communicating with each elongate, linear channel positioned adjacent thereto wherein said series of channels defines a continuous flow path through all of said individual channels, between said inlet and said outlet.

* * * * *